US011556161B1

(12) United States Patent
Kim et al.

(10) Patent No.: US 11,556,161 B1
(45) Date of Patent: Jan. 17, 2023

(54) POWER DELIVERY SYSTEM WITH CHARGING CURRENT LIMITING

(71) Applicant: Microsoft Technology Licensing, LLC, Redmond, WA (US)

(72) Inventors: Donghwi Kim, Kirkland, WA (US); Ying Huang, Sammamish, WA (US); Geo John Palakunnel, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/449,240

(22) Filed: Sep. 28, 2021

(51) Int. Cl.
*G06F 1/26* (2006.01)
*G06F 1/28* (2006.01)
*G06F 1/30* (2006.01)

(52) U.S. Cl.
CPC ............... *G06F 1/28* (2013.01); *G06F 1/263* (2013.01); *G06F 1/30* (2013.01)

(58) Field of Classification Search
CPC ............. G06F 1/263; G06F 1/28; G06F 1/30
See application file for complete search history.

(56) References Cited

U.S. PATENT DOCUMENTS

| | | | | |
|---|---|---|---|---|
| 5,838,982 | A * | 11/1998 | Cooper | G06F 1/3203 713/300 |
| 6,693,782 | B1 * | 2/2004 | Lash | H02J 7/00302 361/87 |
| 7,615,965 | B2 | 11/2009 | Popescu-stanesti et al. | |
| 7,960,950 | B2 | 6/2011 | Glovinsky | |
| 10,069,319 | B2 | 9/2018 | Greening et al. | |
| 2016/0363985 | A1 * | 12/2016 | Ehmann | G06F 9/4403 |
| 2018/0069395 | A1 | 3/2018 | Morii | |

FOREIGN PATENT DOCUMENTS

JP H08265985 A 10/1996

OTHER PUBLICATIONS

Chen, Kuo-Kuang, "A Novel Application of Zero-Current-Switching Quasiresonant Buck Converter for Battery Chargers", In Journal of Mathematical Problems in Engineering, vol. 2011, Sep. 4, 2011, pp. 1-17.

(Continued)

*Primary Examiner* — Mark A Connolly
(74) *Attorney, Agent, or Firm* — Alleman Hall Creasman & Tuttle LLP (57) ABSTRACT

A power delivery system for a computing device includes a power connector, a power delivery switch, a charging circuit, and a hardware controller. The power connector is configured to selectively electrically connect with a power supply unit. The power delivery switch is electrically intermediate the power connector and the charging circuit. The hardware controller is configured to limit a charging current at the charging circuit to a sub-threshold level for a current-limiting duration based at least on initiation of a transition of the power delivery switch from an OFF state to an ON state that lasts for a switching duration that is less than the current-limiting duration. The charging circuit is configured to modulate the charging current to a regulated charging current and deliver the regulated charging current to a system load of the computing device after the current-limiting duration has elapsed.

20 Claims, 8 Drawing Sheets

(56) References Cited

OTHER PUBLICATIONS

Lee, et al., "Quasi-Resonant Zero-Current-Switching Bidirectional Converter for Battery Equalization Applications", In Proceedings of IEEE Transactions on Power Electronics, vol. 21, Issue 5, Sep. 6, 2006, pp. 1213-1224.

"International Search Report and Written Opinion Issued in PCT Application No. PCT/US22/038108", dated Nov. 22, 2022, 9 Pages.

* cited by examiner

POWER DELIVERY SYSTEM WITH CHARGING CURRENT LIMITING

BACKGROUND

A computing device may selectively electrically connect with a power supply unit (PSU) to receive electrical power for charging the computing device. The PSU may be configured to modulate electrical power received from a power source to a form that is suitable for consumption by the computing device. For example, a PSU may be configured to convert alternating current (AC) electrical power received from an electrical socket to direct current (DC) electrical power which may be a suitable form to charge a computing device

SUMMARY

A power delivery system for a computing device includes a power connector, a power delivery switch, a charging circuit, and a hardware controller. The power connector is configured to selectively electrically connect with a power supply unit. The power delivery switch is electrically intermediate the power connector and the charging circuit. The hardware controller is configured to limit the charging current at the charging circuit to a sub-threshold current level for a current-limiting duration based at least on initiation of a transition of the power delivery switch from an OFF state to an ON state that lasts for a switching duration that is less than the current-limiting duration. The charging circuit is configured to modulate the charging current to a regulated charging current and deliver the regulated charging current to a system load of the computing device after the current-limiting duration has elapsed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A computing device may selectively electrically connect with a power supply unit (PSU) to receive electrical power for charging the computing device. The computing device may include a power delivery system that is configured to manage charging of the computing device with electrical power received from the PSU. During PSU transitions, such as when a PSU is electrically connected to a computing device and charging is initiated, inappropriate sequencing of electronic components of the power delivery system can cause reliability issues. For example, when a power delivery switch transitions between an ON and an OFF state, a current spike may occur that stresses operating thresholds (e.g., current rating) of the power delivery switch. Further, such current spikes may result in faulty operation and/or degradation of electronic components of the power delivery system. Moreover, such reliability issues may be exacerbated as PSUs are designed to have higher and higher power delivery voltages (28V, 36V, 48V, etc.).

Accordingly, the present disclosure is directed to power delivery systems and corresponding power delivery methods for reliably providing charging current to a computing device. Specifically, the systems and methods provide a reliable charging sequence in which charging current is forced to a sub-threshold level during PSU transitions (e.g., connecting and initiating charging or disconnecting and stopping charging). For example, the sub-threshold level may be set to zero or another nominal current level. By limiting the charging current to the sub-threshold level during PSU transitions, power loss and heat stress across power delivery switches and other components of the power delivery system may be reduced relative to prior power delivery systems that experience current spikes during PSU transitions.

In some implementations, the reliable charging sequence is provided by a hardware-based solution. In some implementations, the reliable charging sequence is provided by a software-based solutions. In some implementations, the reliable charging sequence is provided by a hardware-based solution and a software-based solution that operate in parallel.

Figure 1:
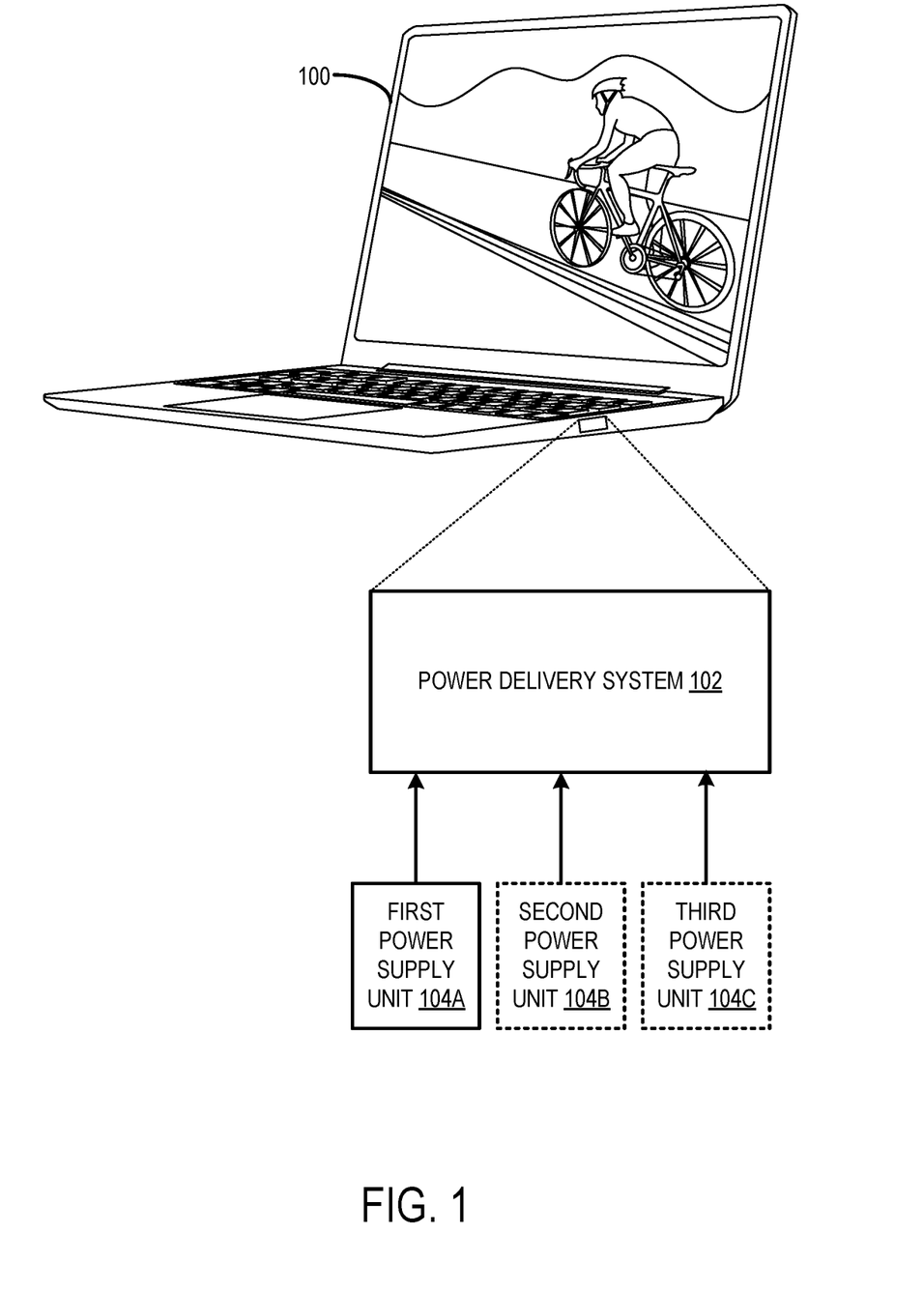
FIG. 1 shows an example computing device including a power delivery system with current-limited switching functionality.

FIG. 1 shows an example computing device in the form of a laptop computer 100. The laptop computer 100 includes a power delivery system 102. The power delivery system 102 is configured to selectively connect with one or more power supply units (PSUs) to receive charging current to power the laptop computer 100. In the illustrated example, the power delivery system 102 is configured to electrically connect with a first PSU 104 to receive charging current from the first PSU 104A. The first PSU 104 may be configured to modulate electrical power received from a power source to a form that is suitable for consumption by the laptop computer 100. For example, the first PSU 104A may be configured to convert alternating current (AC) electrical power received from an electrical socket to direct current (DC) electrical power which may be a suitable form to charge the laptop computer 100.

Optionally, the laptop computer 100 may be configured to electrically connect with more than one PSU. Such functionality provides flexibility for the laptop computer 100 to receiving charging current from different PSUs. In the illustrated example, the laptop computer 100 optionally may be configured to electrically connect with a second PSU 104B and/or a third PSU 104C, alternatively or in addition to the first PSU 104A. The different PSUs may have different operating characteristics. In one example, the different PSUs may have different power levels (e.g., 60 W, 80 W, 120 W). In another example, the different PSUs may electrically connect with the power delivery system 102 via different types of electrical connections. As one example, the first PSU 104A and the second PSU 104B may electrically connect to the power delivery system 102 via a USB-C type power connector, and the third PSU 104C may electrically connect to the power delivery system 102 via a with a Microsoft Surflink™ power connector. The power delivery system 102 may be configured to electrically connect (and physically connect) with any suitable PSU having any suitable operating characteristics via any suitable power connector.

The power delivery system 102 is configured to manage charging of the laptop computer 100 with electrical power received from a connected PSU. In some implementations, when multiple PSUs are electrically connected to the power delivery system 102, the power delivery system 102 may be configured to select a PSU from which to receive electrical power for charging the laptop computer 100. In some examples, the power delivery system 102 may select a PSU based at least on a designated priority order. In some examples, the priority order may prioritize selecting a PSU having a first type of power connector over a second type of power connector. For example, a PSU having a Microsoft Surflink™ power connector may be selected over a PSU having an USB-C power connector. In some examples, the priority order may prioritize selecting a PSU having a higher power level over a PSU having a lower power level. The power delivery system 102 may select a PSU from which to receive electrical power for charging the laptop computer 100 based at least on any suitable operating characteristics of the PSU and/or any suitable operation conditions of the laptop computer 100.

Furthermore, the power delivery system 102 may be configured to provide a reliable charging sequence in which charging current is forced to a sub-threshold current level during PSU transitions (e.g., connecting and initiating charging or disconnecting and stopping charging) as will be described in more detail below.

The laptop computer 100 is provided as a non-limiting example of a computing device that includes a power delivery system that provides reliable charging functionality by limiting the charging current provided by the PSU to a sub-threshold current level during PSU transitions. Typically, it is convenient to set the sub-threshold current level to zero, and the examples described herein reflect that. It should however be appreciated that the sub-threshold current level may be set to any current level that reduces stress on the electronic components of the power delivery system 102. For example, the sub-threshold current level may be set to allow for the electronic components of the power delivery system 102 to operate within standard protective thresholds set for the electronic components.

The concepts discussed herein are broadly applicable to any suitable computing device that is capable of electrically connecting with a PSU to receive charging current. Other non-limiting examples of computing devices that may be configured to have such capabilities include desktop computing devices, tablet computing devices, game consoles, server computing devices, smart televisions, smart appliances, all-in-one computing devices, augmented reality or mixed reality computing devices, smartphones, wearable computing devices, and other types of computing devices.

Figure 2:
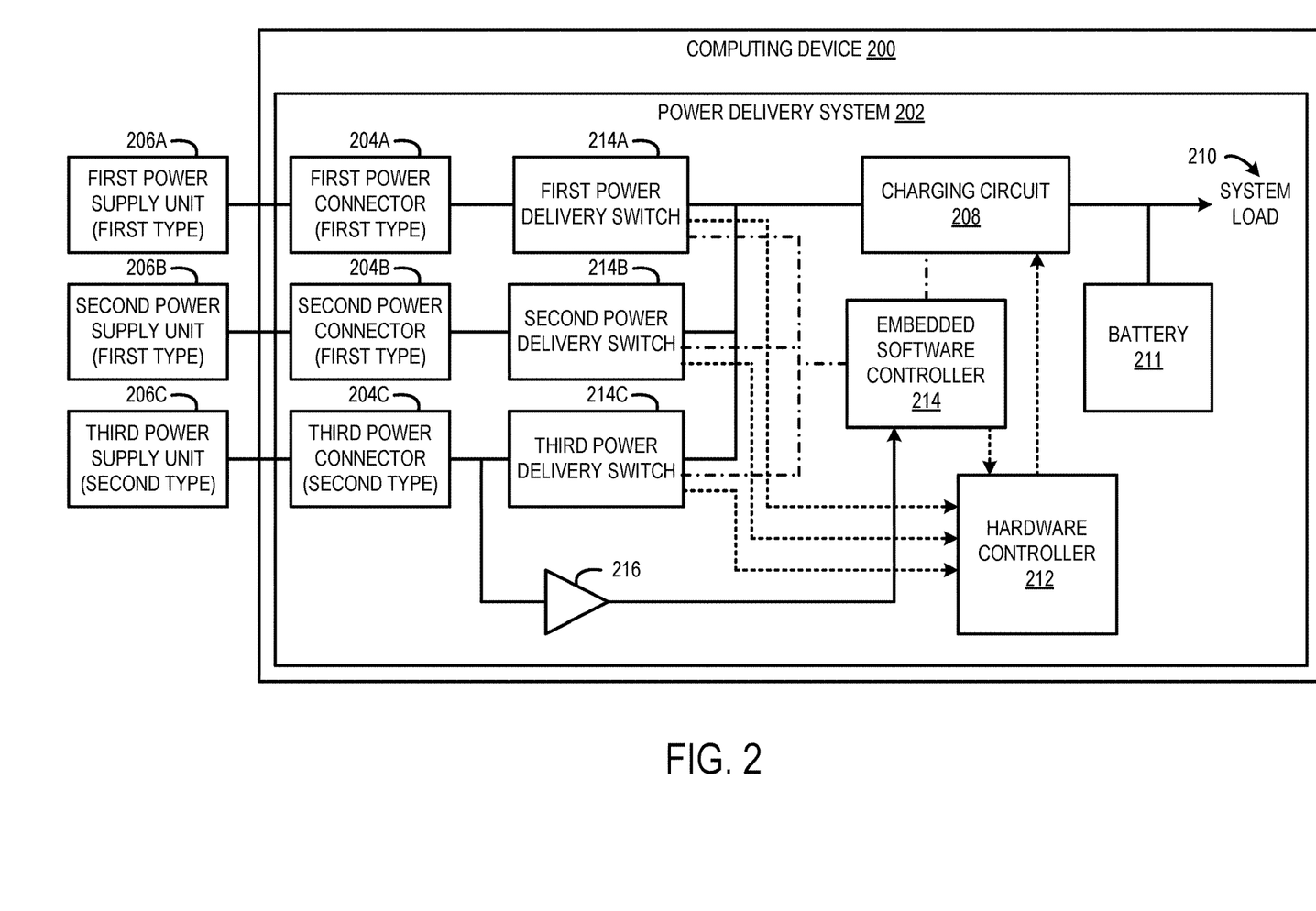
FIG. 2 is a system block diagram showing an example power delivery system of a computing device.

FIG. 2 shows an example computing device 200 including a power delivery system 202 configured to provide reliable charging functionality. For example, the computing device 200 may correspond to the laptop computer 100 shown in FIG. 1, and the power delivery system 202 may correspond to the power delivery system 102 shown in FIG. 1.

The power delivery system 202 may include one or more power connectors configured to selectively electrically connect with one or more corresponding PSUs. In the illustrated example, the power delivery system 202 includes a first power connector 204A, a second power connector 204B, and a third power connector 204C. The first power connector 204A is configured to selectively electrically connect with a first PSU 206A. The second power connector 204B is configured to selectively electrically connect with a second PSU 206B. The third power connector 204C is configured to selectively electrically connect with a third PSU 206C.

In some examples, the first, second, and third power connectors 204A, 204B, 204C may be different types of power connectors. In one example, the first and second power connectors 204A and 204B are USB-C type power connectors and the third power connector 204C is a Microsoft Surflink™ power connector type power connector. The first, second, and third power connectors 204A, 204B, 204C may be any suitable type of power connectors.

In some examples, the first, second, and third power connectors 204A, 204B, 204C may be configured to electrically connect with different PSUs having different power levels. For example, the first PSU 206A may have a power level of 60 W, the second PSU 206B may have a power level 80 W, and the third PSU 206C may have a power level of 120 W. The first, second, and third PSUs 206A, 206B, 206C may have any suitable power level.

The power delivery system 202 includes a charging circuit 208 configured to selectively receive charging current from an electrically connected PSU. The charging circuit 208 is configured to modulate the charging current to a regulated charging current and deliver the regulated charging current to a system load 210 and/or a battery 211 of the computing device 200.

A flow of charging current from the first, second, and third PSUs 206A, 206B, 206C to the charging circuit 208 may be controlled based at least on a state of a plurality of corresponding power delivery switches including a first power delivery switch 214A, a second power delivery switch 214B, and a third power delivery switch 214C. The first power delivery switch 214A is electrically intermediate the first power connector 204A and the charging circuit 208. The second power delivery switch 214B is electrically intermediate the second power connector 204B and the charging circuit 208. The third power delivery switch 214C is electrically intermediate the third power connector 204C and the charging circuit 208.

The first, second, and third power delivery switches 214A, 214B, 214C may take any suitable form. In some implementations the power delivery switches may be semiconductor switches, such as field effect transistors (FETs). In some implementations, the power delivery switches may be integrated on a common integrated circuit (IC). In some implementations, each of the power delivery switches may be configured as an ideal diode configured to prevent a reverse current from flowing through the power delivery switch to a corresponding PSU as will be discussed in further detail below with reference to FIGS. 4 and 5.

Each of the first, second, and third power delivery switches 214A, 214B, 214C is configured to transition between an OFF state and an ON state to control a flow of charging current from a corresponding electrically connected PSU to the charging circuit 208. For example, when the first power delivery switch 214A is in the ON state, the first power delivery switch 214A allows a charging current to flow from the first PSU 206A through the first power connector 204A and through the first power delivery switch 214A to the charging circuit 208. When the first power delivery switch 214A is in the OFF state, the first power delivery switch 214A prevents a charging current from flowing from the first PSU 206A to the charging circuit 208. The second and third power delivery switches 214B and 214C may be configured to operate in the same manner as the first power delivery switch 214A.

For each of the first, second, and third power delivery switches 214A, 214B, 214C, a transition of the power delivery switch between the OFF state and the ON state may last for a switching duration. In one example, the switching duration is defined by the time it takes for a drain-to-source voltage (VDS) of a power delivery switch to go from low to high or high to low. For example, a length of the switching duration may be on the order of one or more milliseconds. The length of the switching duration may be any suitable duration and may be based at least on the design/operating characteristics of the power delivery switch.

As discussed above, in prior power delivery systems, a spike in charging current would occur during a PSU transition when a power delivery switch would transition between the OFF state and the ON state—i.e., during the switching duration. Such increases in charging current would place stress on the power delivery switches (and other electronic components of the power delivery system) that would cause faulty operation and/or degradation of electronic components of the power delivery system.

To address these and other issues, the power delivery system 202 includes a hardware controller 212 that is configured to limit the charging current at the charging circuit 208 to a sub-threshold current level that is less than the normal-operation charging current any time any one of the first, second, and third power delivery switches 214A, 214B, 214C transitions between the OFF state and the ON state. Typically, the sub-threshold current level is set to zero based on the design of the power delivery system. As such, the examples set for reflect that the sub-threshold current level is referred to as being set to zero. However, it will be appreciated that the sub-threshold current level may be set to any suitable current level that reduces stress on the electronic components of the power delivery system 202.

The hardware controller 212 is communicatively coupled with each of the first, second, and third power delivery switches 214A, 214B, 214C (indicated by the dashed communication lines in FIG. 2). When a power delivery switch initiates a transition between the ON state and the OFF state, the hardware controller 212 receives a signal indicating that the power delivery switch is initiating such a transition. Based at least on detecting a transition of any power delivery switch between ON and OFF states, the hardware controller 212 is configured to force the charging current of the charging circuit 208 to zero for a current-limiting duration. In particular, the hardware controller 212 is communicatively coupled with the charging circuit 208 and is configured to send a current limiting signal to the charging circuit 208 that forces the charging current to zero for the current-limiting duration. The current-limiting duration is greater than the switching duration of the power delivery switch.

In some examples, the hardware controller 212 may include a hardware timer configured to set the current-limiting duration. The current-limiting duration may be set to any suitable length of time that is greater than the switching duration in order to allow for the power delivery switch to fully turn ON or OFF.

The hardware controller 212 may be configured to stop limiting the charging current to zero once the current-limiting duration has elapsed. Further, the charging circuit 208 may be configured to modulate the charging current to a regulated charging current after the current limiting duration has elapsed and deliver the regulated charging current to the system load 210 and/or the battery 211 of the computing device 200. The charging circuit 208 may be configured to modulate the charging current in any suitable manner to generate the regulated charging current in a suitable form for consumption by the system load 210 and/or the battery 211.

Figure 3:
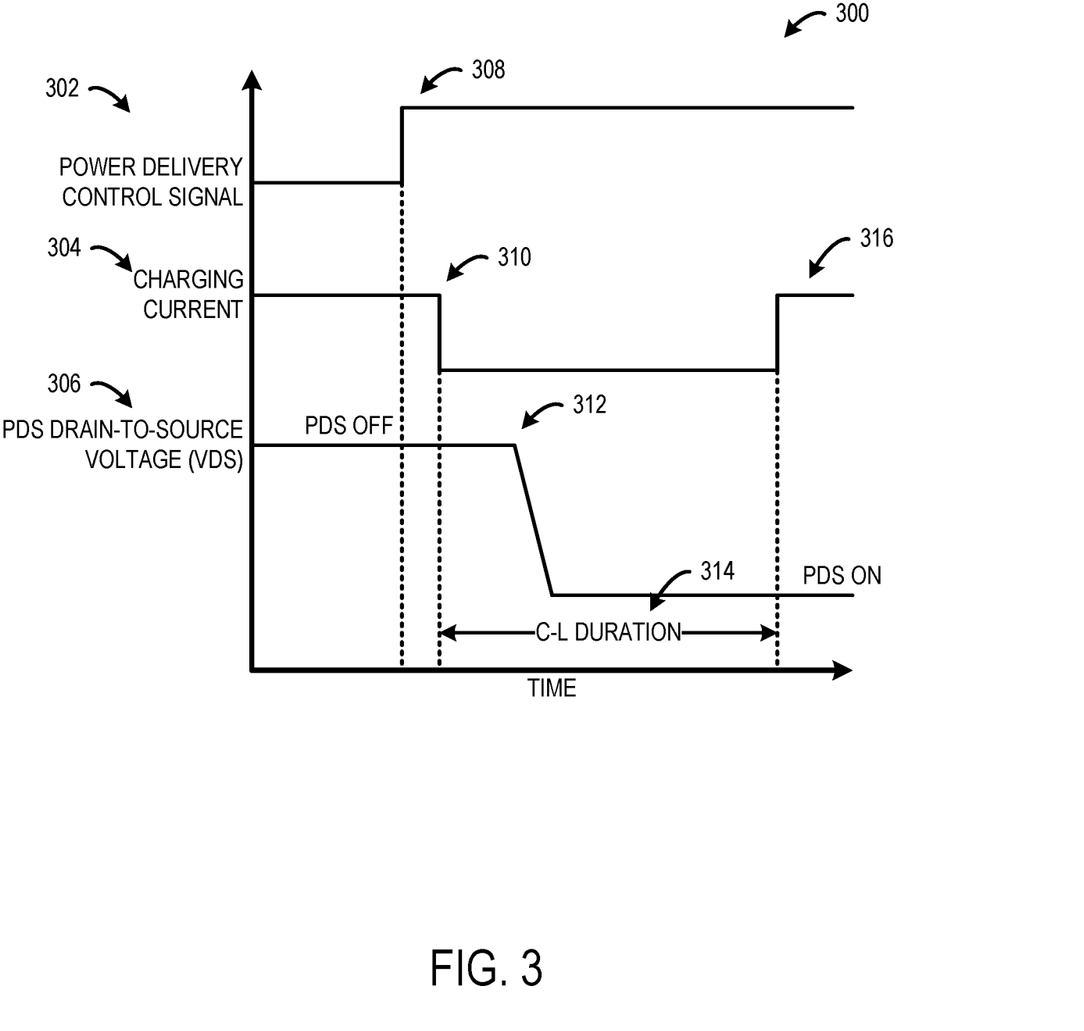
FIG. 3 is a timing diagram showing an example zero current switching scenario.

FIG. 3 is a timing diagram 300 showing an example zero current switching scenario. The timing diagram 300 includes a power delivery control signal 302 that is received by the hardware controller 212 shown in FIG. 2 from a power delivery switch, a charging current 304 at the charging circuit 208 shown in FIG. 2, and a drain-to-source voltage (VDS) 306 across the power delivery switch. At 308, the power delivery control signal 302 goes from low to high indicating that a PSU is electrically connected with a power connector that is electrically connected to the power delivery switch. Subsequently, at 310, the hardware controller forces the charging current 304 to zero based at least on the power delivery control signal 302 going from low to high. At 312, the power delivery switch initiates a transition from the OFF state to the ON state based at least on the PSU electrically connecting with the power connector. The power delivery switch initiates the transition from the OFF state to the ON state after the charging current 304 has been forced to zero as indicated by the VDS 306 going from high to low. The charging current 304 is forced to zero by the hardware controller 212 for a current-liming duration 314 that is greater than a switching duration for the power delivery switch to fully turn on. At 316, after the current-limiting duration 314 has elapsed, the hardware controller 316 stops limiting the charging current 304 to zero and the charging current goes from low to high. By forcing the charging current to zero during PSU transitions, power loss and heat stress across the power delivery switch may be reduced relative to power delivery systems that experience current spikes during PSU transitions. Such a hardware feature increases reliability of the power delivery system 202 independent of software monitoring of the power delivery system 202.

Returning to FIG. 2, in some implementations, the hardware controller 212 may be configured to limit the charging current only when a power delivery switch transitions from the OFF state to the ON state. In some such implementations, for a transition of a power delivery switch from the ON state to the OFF state, operating characteristics of the power delivery switch may be designed or selected for fast current off characteristics, such that the power delivery switch fully turns OFF before the charging current increases to a stress inducing level. In some examples, each of the first, second, and third power delivery switches 214A, 214B, 214C may be configured as an ideal diode configured to prevent a reverse current from flowing through the power delivery switch to the power supply unit.

Figure 4:
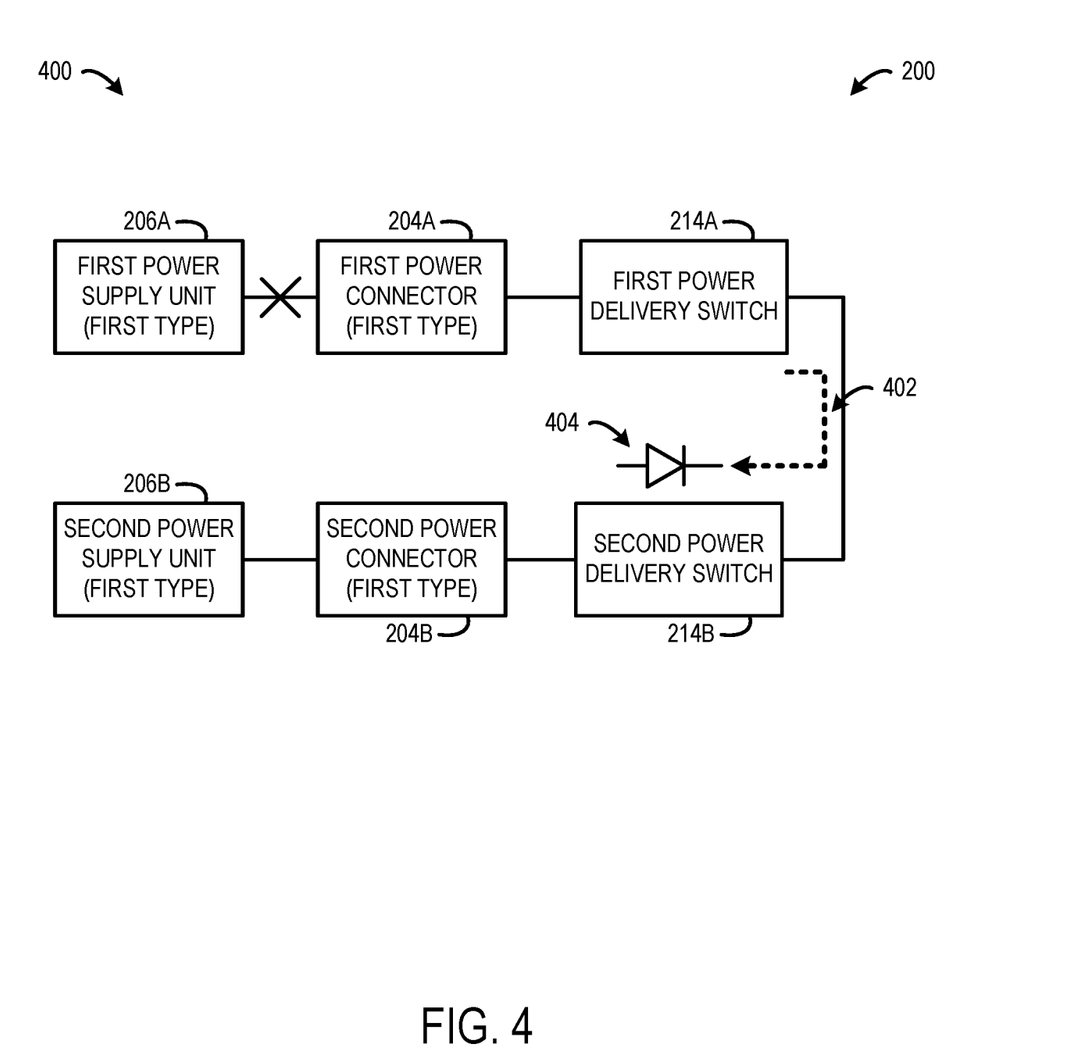
FIG. 4 shows an example scenario in which a power delivery switch blocks a reverse current.

FIG. 4 shows an example scenario 400 in which the power delivery system 202 blocks reverse current based on a PSU disconnecting from the power delivery system 202. Note that just a portion of the power delivery system 202 that is relevant to the scenario 400 is shown in FIG. 4. In the scenario 400, the first PSU 206A and the second PSU 206B initially are electrically connected to the power delivery system 202. Then, the first PSU 206A electrically disconnects form the first power connector 204A. Due to electrical inertia of the charging current, a reverse current 402 flows from the first power delivery switch 214A to the second power delivery switch 214B. The second power delivery switch 214B is configured as an ideal diode 404 to prevent the charging current from flowing through the second power delivery switch 214B to the second power connector 204B. Each of the first, second, and third power delivery switches 214A, 214B, and 214C may be configured as ideal diodes to prevent reverse current from flowing back into the corresponding power connector. Such a hardware feature increases reliability of the power delivery system 202 independent of software monitoring of the power delivery system 202.

Returning to FIG. 2, the power delivery system 202 includes an embedded software controller 214 configured to orchestrate zero charging current initiation at the charging circuit 208 before any of the first, second, or third power delivery switches 214A, 214B, 214C transitions between an ON state and an OFF state based at least on any corresponding PSU transitions. Further, the embedded software controller 214 may be configured to, during a PSU transition, execute step-by-step read confirmations over communication channels after each written command to increase reliability of the power delivery system. Further still, the embedded software controller 214 may be configured to manage charging when multiple PSUs are electrically connected to the power delivery system 200 at the same time.

The embedded software controller 214 is communicatively coupled with each of the first, second, and third power delivery switches 214A, 214B, 214C, the charging circuit 208, and the hardware controller 212 (indicated by the dot-dashed communication lines in FIG. 2).

In implementations where the third power connector 204C is a different type of power connector than the first and second power connectors 204A, 204B (e.g., the first and second power connectors 204A, 204B are USB-C power connectors and the third power connector 204C is a Microsoft Surflink™ power connector), the power delivery system 202 may include a hardware comparator 216 electrically connected to the third power connector 204C and the embedded software controller 214. The hardware comparator 216 may be configured to provide an indication to the embedded software controller 214 that the third PSU is either electrically connected or disconnected to the third power connector 204C. Such a hardware comparator may not be needed for the USC-C type power connectors, because those power connectors may be incorporated into a common IC from which the embedded software controller 214 may read out the connection status directly. In other implementations, hardware comparators may be used to indicate a connection status of any of the power connectors.

Figure 5:
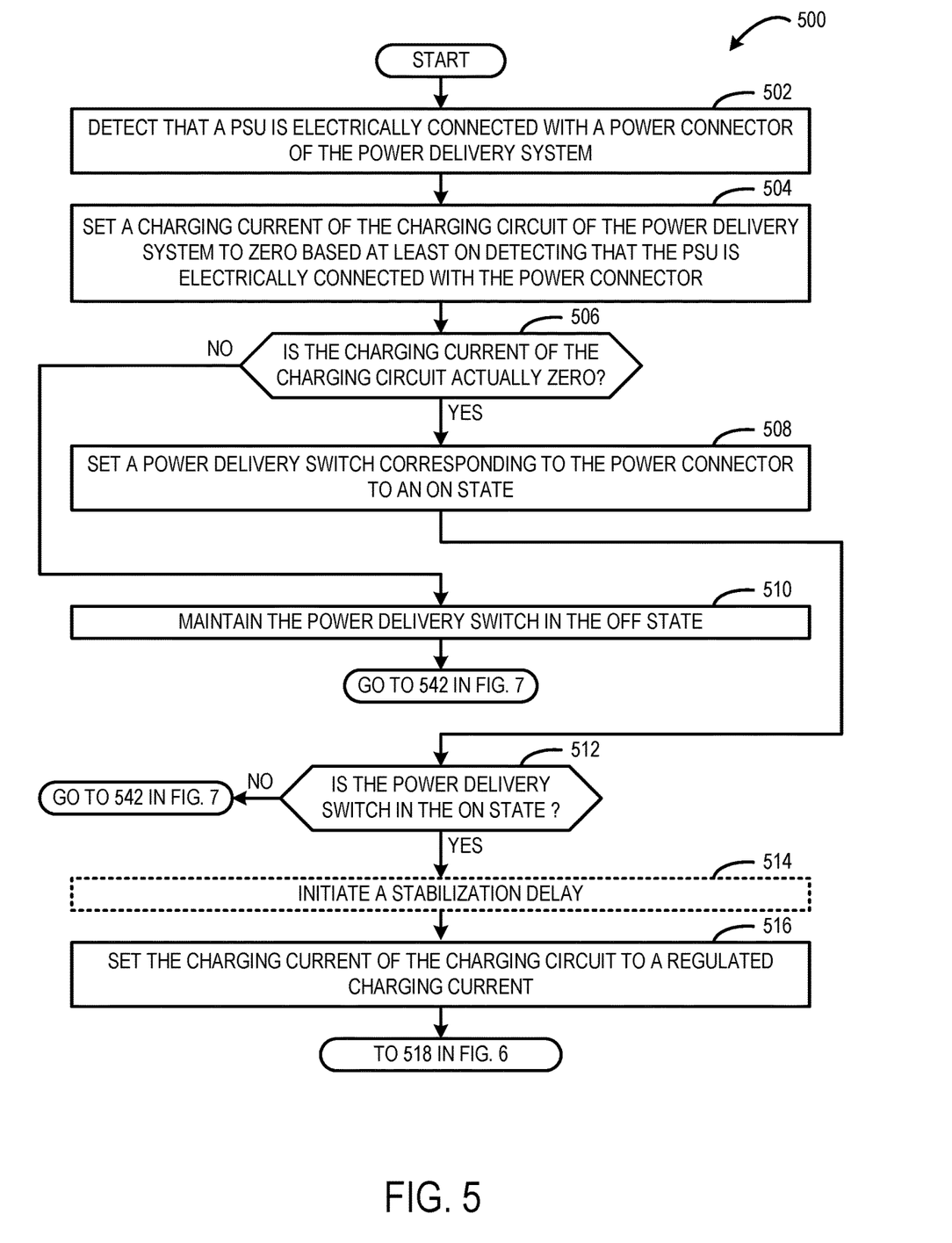
FIGS. 5-7 show a flowchart of an example method for controlling a power delivery system of a computing device.
Figure 6:
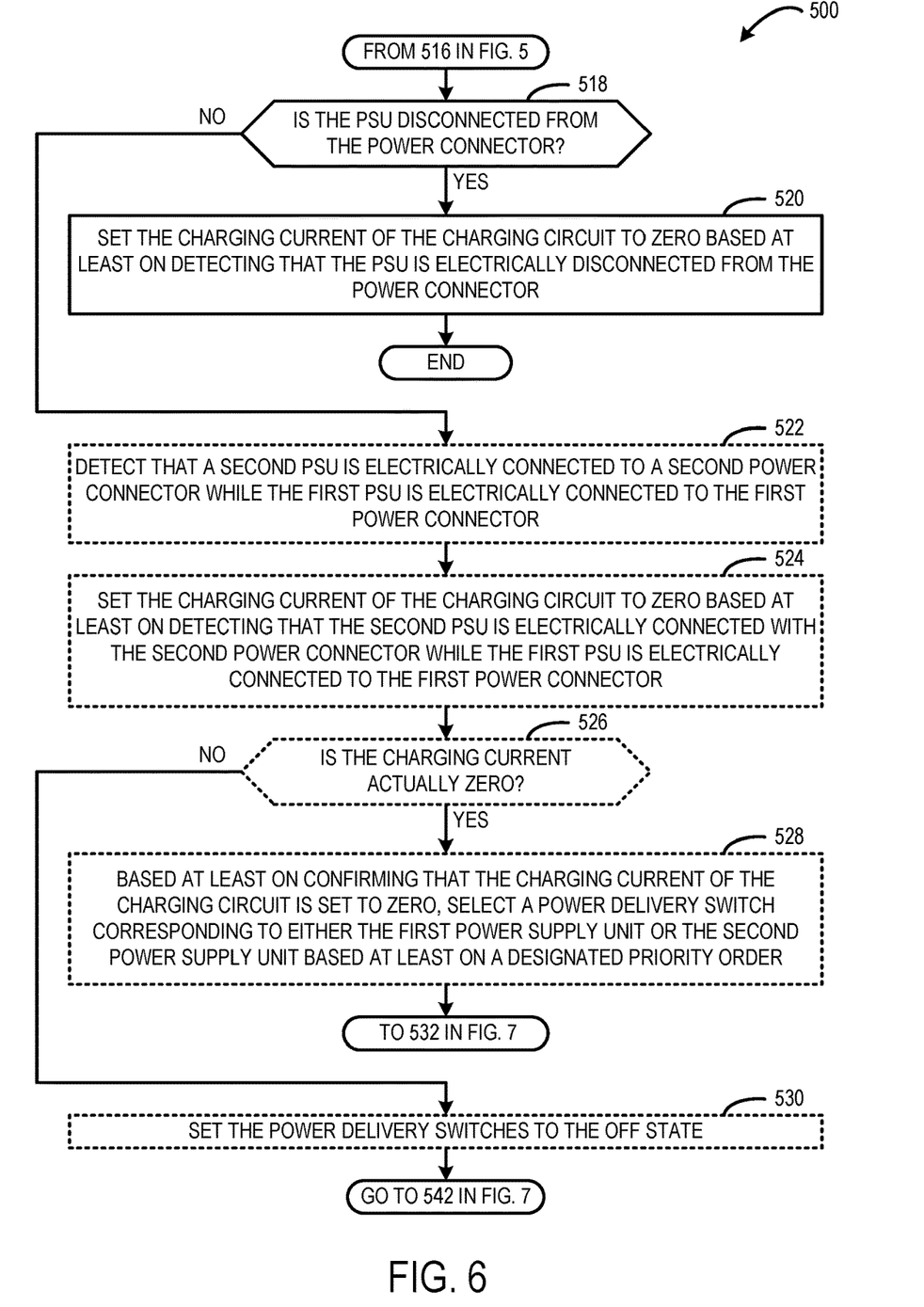
Figure 7:
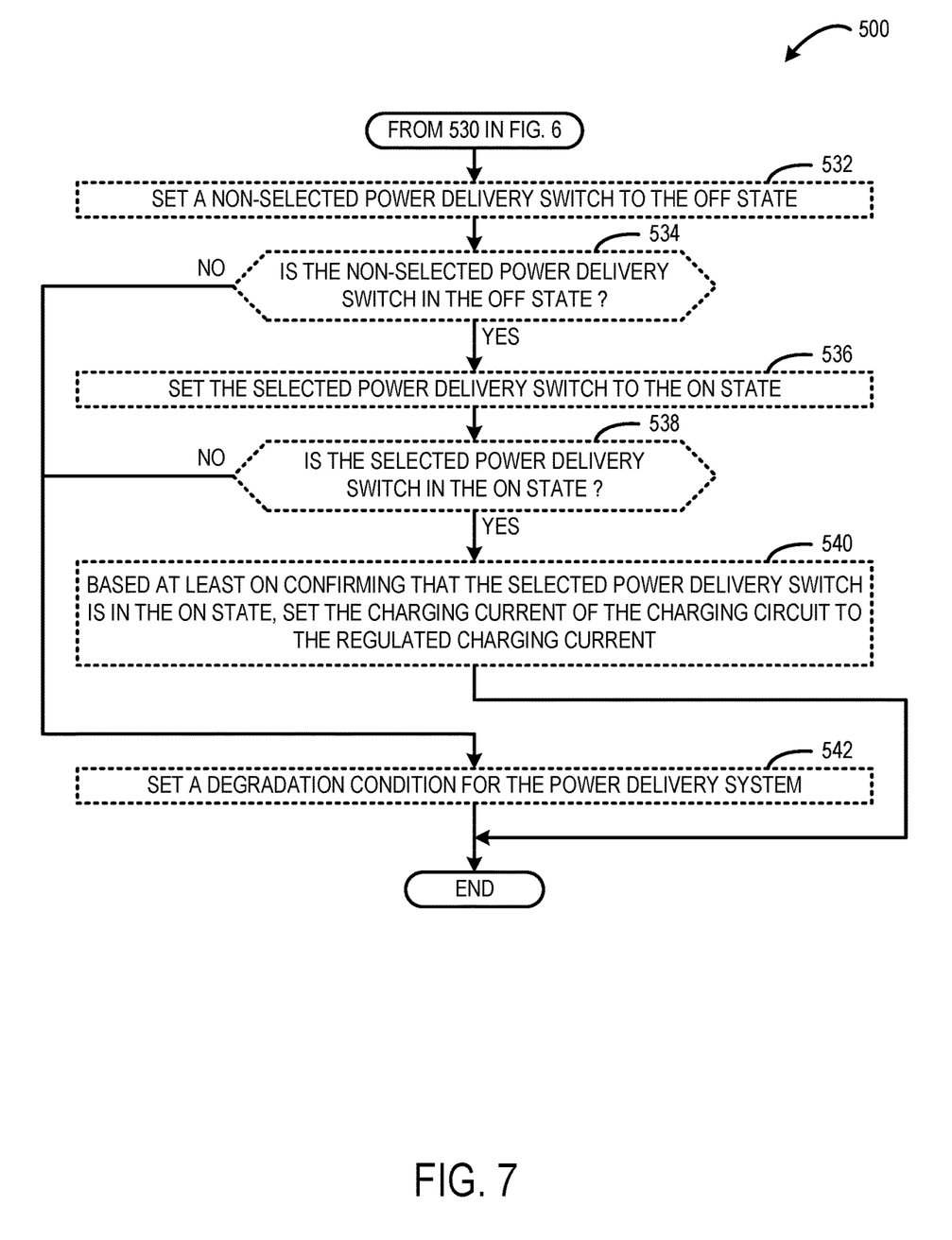

The embedded software controller 212 may be configured to perform an example method 500 shown in FIGS. 5-7 to provide reliable zero current switching and charging management functionality for the power delivery system 202. In general, the example method 500 may be performed by a power delivery system of any suitable computing device to reliably manage charging of the computing device.

In FIG. 5, at 502, the method 500 includes detecting that a PSU is electrically connected with a power connector of the power delivery system. In some examples, such detection may be based at least on the embedded software controller receiving a contracted voltage level negotiated by the PSU and the power connector.

At 504, the method 500 includes setting a charging current of the charging circuit of the power delivery system to zero based at least on detecting that the power supply unit is electrically connected with the power connector. In some examples, the software charger may set the charging current to zero by directly communicating with the charging circuit. In other examples, the software charger may set the charging current to zero by commanding the hardware controller to perform current limiting of the charging circuit.

Note that the charging current is set to a sub-threshold current level that is zero in this example. In other examples, the sub-threshold current level may be another current level that reduces stress on the electronic components of the power delivery system.

At 506, the method 500 includes confirming if the charging current of the charging circuit is actually zero (or at or below some other sub-threshold current). For example, the embedded software controller may perform such a confirmation by reading the charging current of the charging circuit. If it is confirmed that the charging current is actually zero, then the method 500 moves to 508. Otherwise, the method 500 moves to 510.

At 508, the method 500 includes, based at least on confirming that the charging current of the charging circuit is actually zero, setting a power delivery switch corresponding to the power connector to an ON state and moving to 512. The transition of the power delivery switch from the OFF state to the ON state lasts for a switching duration In the ON state, the power delivery switch allows a charging current to flow from the power supply unit through the power connector and through the power delivery switch to the charging circuit.

At 510, the method 500 includes, based at least on confirming that the charging current is not zero (or above some other sub-threshold level), maintaining the power delivery switch in the OFF state and moving to 542 in FIG. 7. In the OFF state, the power delivery switch prevents the charging current from flowing to the charging circuit.

At 512, the method 500 includes confirming if the power delivery switch is in the ON state. If the power delivery switch is in the ON state, then the method 500 moves to 514. Otherwise the method 500 moves to 542 in FIG. 7.

In some implementations, at 514, the method 500 optionally may include, based at least on confirming that the power delivery switch is in the ON state, initiating a stabilization delay. The stabilization delay may be a predefined duration that allows for any transient switching conditions to stabilize.

At 516, the method 500 includes, based at least on confirming that the power delivery switch is in the ON state, setting the charging current of the charging circuit to a regulated charging current. The charging circuit is configured to deliver the regulated charging current to a system load of the computing device. In implementations where a stabilization delay is initiated, the charging current may be set to the regulated charging current after the stabilization delay has elapsed.

In FIG. 6, at 518, the method 500 includes detecting if the PSU is electrically disconnected from the power connector. For example, the embedded software controller may perform such detection by reading the voltage of the power connector corresponding to the PSU. If the PSU is disconnected from the power connector, then the method 500 moves to 520. Otherwise, the method 500 moves to 522.

At 520, the method 500 includes setting the charging current of the charging circuit to zero (or some other sub-threshold level) based at least on detecting that the PSU is electrically disconnected from the power connector and then the method ends.

In some implementations where the power delivery system is configured to allow multiple PSUs to electrically connect to the power delivery system at the same time, at 522, the method 500 optionally may include detecting that a second PSU is electrically connected to the second power connector while the first PSU is electrically connected to the first power connector. At 524, the method 500 optionally may include setting the charging current of the charging circuit to zero based at least on detecting that the second power supply unit is electrically connected with the second power connector while the first power supply unit is electrically connected to the first power connector. At 526, the method 500 optionally may include confirming if the charging current of the charging circuit is actually zero. If the charging current is actually zero, then the method 500 moves to 528. Otherwise, the method 500 moves to 530. At 528, the method 500 optionally may include based at least on confirming that the charging current of the charging circuit is actually zero, selecting a power delivery switch corresponding to either the first power supply unit or the second power supply unit based at least on a designated priority order and moving to 532 in FIG. 7. In some examples, the priority order may prioritize selecting a first type of power connector over a second type of power connector to provide charging current to the power delivery system. In other examples, the priority order may prioritize selecting a power supply unit having a higher power level over a power supply unit having a lower power level to provide charging current to the power delivery system. At 530, the method 500 optionally may include setting the power delivery switches to the OFF state and moving to 542 in FIG. 7.

In FIG. 7, at 532, the method 500 optionally may include setting a non-selected power delivery switch of the first power delivery switch or the second power delivery switch to the OFF state. At 534, the method 500 optionally may include confirming if the non-selected power delivery switch is in the OFF state. If the non-selected power delivery switch is in the OFF state, then the method 500 moves to 536. Otherwise, the method 500 moves to 542 in FIG. 7.

At 536, the method 500 optionally may include based at least on confirming that the non-selected power delivery switch is in the OFF state, setting the selected power delivery switch to the ON state. At 538, the method 500 optionally may include confirming if the selected power delivery switch is in the ON state. If the selected power delivery switch is in the ON state, then the method 500 moves to 540. Otherwise the method 500 moves to 542. At 540, the method 500 optionally may include based at least on confirming that the selected power delivery switch is in the ON state, setting the charging current of the charging circuit to the regulated charging current and then the method ends. At 542, the method 500 optionally may include setting a degradation condition for the power delivery system to indicate that the power delivery system is not functioning properly and then the method ends.

The method 500 may be performed by the embedded software controller 214 to force zero charging current during PSU transitions as well as to manage charging between multiple PSUs.

In some implementations, the power delivery system 202 may implement just the hardware controller 212 to manage the charging current during PSU transitions. In some implementations, the power delivery system 202 may implement just the embedded software controller 214 to manage the charging current during PSU transitions. In some implementations, the power delivery system 202 may implement both the hardware controller 212 and the embedded software controller 2134 in parallel to manage the charging current during PSU transitions.

In some implementations, the methods and processes described herein may be tied to a computing system of one or more computing devices. In particular, such methods and processes may be implemented as a computer-application program or service, an application-programming interface (API), a library, and/or other computer-program product.

Figure 8:
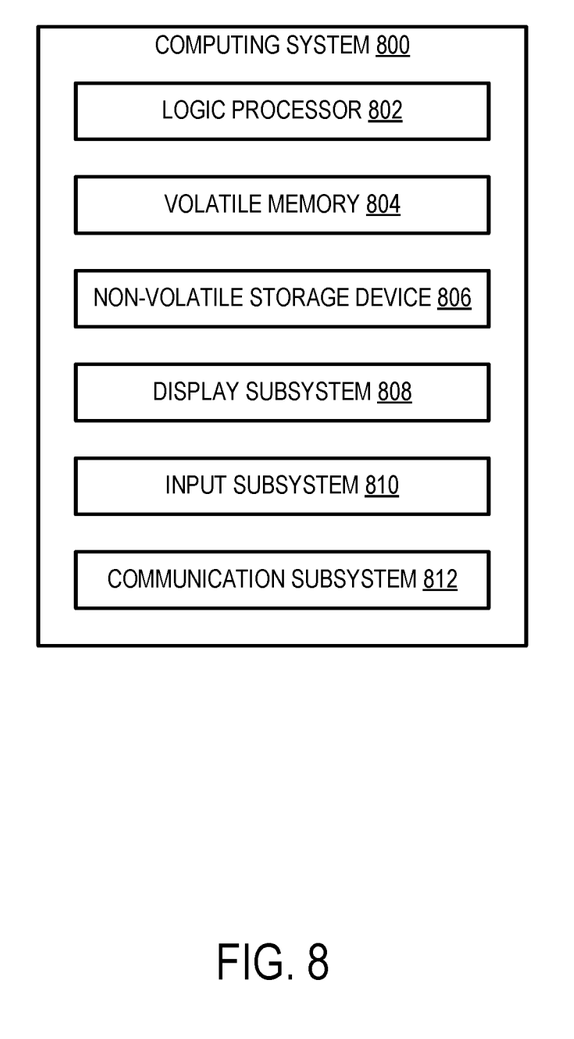
FIG. 8 shows an example computing system.

FIG. 8 schematically shows a non-limiting implementation of a computing system 800 that can enact one or more of the methods and processes described above. Computing system 800 is shown in simplified form. Computing system 800 may embody the laptop computer 100 shown in FIG. 1 and the computing device 200 shown in FIG. 2. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches, backpack host computers, and head-mounted augmented/mixed virtual reality devices.

Computing system 800 includes a logic processor 802, volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 802 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, microphone for speech and/or voice recognition, a camera (e.g., a webcam), or game controller.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 800 to send and/or receive messages to and/or from other devices via a network such as the Internet.

In an example, a system comprises a power connector configured to selectively electrically connect with a power supply unit, a power delivery switch electrically intermediate the power connector and a charging circuit and configured to transition from an OFF state to an ON state, wherein the transition of the power delivery switch from the OFF state to the ON state lasts for a switching duration, and where, in the ON state, the power delivery switch allows charging current to flow from the power supply unit through the power connector and through the power delivery switch to the charging circuit, and a hardware controller configured to limit the charging current at the charging circuit to a sub-threshold current level for a current-limiting duration that is greater than the switching duration based at least on initiation of the transition of the power delivery switch from the OFF state to the ON state, wherein the charging circuit is configured to modulate the charging current to a regulated charging current after the current-limiting duration has elapsed, and deliver the regulated charging current to a system load of a computing device. In this example and/or other examples, the sub-threshold current level optionally may be zero. In this example and/or other examples, the system optionally may further comprise a software controller communicatively coupled with the power delivery switch and the charging circuit and configured to 1) set the charging current of the charging circuit to at or below the sub-threshold current level based at least on the power supply unit electrically connecting with the power connector, 2) based at least on confirming that the charging current of the charging circuit is at or below the sub-threshold level, set the power delivery switch to the ON state, and 3) based at least on confirming that the power delivery switch is in the ON state, set the charging current of the charging circuit to the regulated charging current. In this example and/or other examples, the software controller optionally may be configured to, subsequent to setting the charging current to at or below the sub-threshold current level and based at least on confirming that the charging current is not at or below the sub-threshold current level, maintain the power delivery switch in the OFF state, where, in the OFF state, the power delivery switch prevents the charging current from flowing to the charging circuit. In this example and/or other examples, the software controller optionally may be configured to, 1) based at least on confirming that the power delivery switch is in the ON state, initiate a stabilization delay, and 2) set the charging current of the charging circuit to the regulated charging current after the stabilization delay has elapsed. In this example and/or other examples, the software controller optionally may be configured to set the charging current of the charging circuit to at or below the sub-threshold current level based at least on the power supply unit becoming electrically disconnected from the power connector. In this example and/or other examples, the power connector optionally may be a first power connector, the power delivery switch optionally may be a first power delivery switch, and the system optionally may further comprise a second power connector configured to selectively electrically connect with a second power supply unit, and a second power delivery switch electrically intermediate the second power connector and the charging circuit and configured to transition from an OFF state to an ON state, the transition of the second power delivery switch from the OFF state to the ON state optionally may take place over a switching duration, and, in the ON state, the second power delivery switch optionally may allow charging current to flow from the second power supply unit, through the second power connector to the charging circuit, the hardware controller optionally may be configured to limit the charging current at the charging circuit to the sub-threshold current level for a current-limiting duration that is greater than the switching duration of the second power delivery switch based at least on initiation of the transition of the second power delivery switch from the OFF state to the ON state. In this example and/or other examples, the software controller optionally may be configured to 1) set the charging current of the charging circuit to at or below the sub-threshold current level based at least on the second power supply unit electrically connecting with the second power connector, 2) based at least on confirming that the charging current of the charging circuit is at or below the sub-threshold current level, select a power delivery switch corresponding to either the first power supply unit or the second power supply unit based at least on a designated priority order, 3) set the selected power delivery switch to the ON state, and 4) based at least on confirming that the selected power delivery switch is in the ON state, set the charging current of the charging circuit to the regulated charging current. In this example and/or other examples, the software controller optionally may be configured to 1) set a non-selected power delivery switch of the first power delivery switch or the second power delivery switch to the OFF state, 2) based at least on confirming that the non-selected power delivery switch is in the OFF state, set the selected power delivery switch to the ON state. In this example and/or other examples, the first power connector and the second power connector optionally may be different types of power connectors, and the priority order may prioritize selecting a first type of power connector over a second type of power connector. In this example and/or other examples, the first power supply unit and the second power supply unit may have different power levels, and the priority order may prioritize selecting a power supply unit having a higher power level over a power supply unit having a lower power level.

In another example, a method for controlling a power delivery system of a computing device comprises detecting that a power supply unit is electrically connected with a power connector of the power delivery system, setting a charging current of a charging circuit of the power delivery system to at or below a sub-threshold current level based at least on detecting that the power supply unit is electrically connected with the power connector, confirming that the charging current of the charging circuit is at or below the sub-threshold current level, based at least on confirming that the charging current of the charging circuit is at or below the sub-threshold current level, setting a power delivery switch of the power delivery system to an ON state, the power delivery switch electrically intermediate the power connector and the charging circuit, and where, in the ON state, the power delivery switch allows charging current to flow from the power supply unit through the power connector and through the power delivery switch to the charging circuit, confirming that the power delivery switch is in the ON state, and based at least on confirming that the power delivery switch is in the ON state, setting the charging current of the charging circuit to a regulated charging current, wherein the charging circuit is configured to deliver the regulated charging current to a system load of a computing device. In this example and/or other examples, the sub-threshold current level optionally may be zero. In this example and/or other examples, the method optionally may further comprise subsequent to setting the charging current to at or below the sub-threshold current level, confirming that the charging current is not at or below the sub-threshold current level, and based at least on confirming that the charging current is not at or below the sub-threshold current level, maintaining the power delivery switch in the OFF state, where, in the OFF state, the power delivery switch prevents charging current from flowing to the charging circuit. In this example and/or other examples, the method optionally may further comprise based at least on confirming that the power delivery switch is in the ON state, initiating a stabilization delay, and setting the charging current of the charging circuit to the regulated charging current after the stabilization delay has elapsed. In this example and/or other examples, the method optionally may further comprise detecting that the power supply unit is electrically disconnected from the power connector, and setting the charging current of the charging circuit to at or below the sub-threshold current level based at least on detecting that the power supply unit is electrically disconnected from the power connector. In this example and/or other examples, the power connector optionally may be a first power connector, the power delivery switch optionally may be a first power delivery switch, the power delivery system optionally may further comprise a second power connector configured to selectively electrically connect with a second power supply unit, the power delivery system optionally may further comprise a second power delivery switch electrically intermediate the second power connector and the charging circuit and configured to transition from an OFF state to an ON state, in the ON state, the second power delivery switch optionally may allow a charging current to flow from the second power supply unit, through the second power connector to the charging circuit, and the method optionally may further comprise detecting that the second power supply unit is electrically connected to the second power connector while the first power supply unit is electrically connected to the first power connector, setting the charging current of the charging circuit to at or below the sub-threshold current level based at least on detecting that the second power supply unit is electrically connected with the second power connector while the first power supply unit is electrically connected to the first power connector, confirming that the charging current of the charging circuit is at or below the sub-threshold current level, based at least on confirming that the charging current of the charging circuit is at or below the sub-threshold current level, selecting a power delivery switch corresponding to either the first power supply unit or the second power supply unit based at least on a designated priority order, setting the selected power delivery switch to the ON state, confirming that the selected power delivery switch is in the ON state, and based at least on confirming that the selected power delivery switch is in the ON state, setting the charging current of the charging circuit to the regulated charging current. In this example and/or other examples, the method optionally may further comprise setting a non-selected power delivery switch of the first power delivery switch or the second power delivery switch to the OFF state, confirming that the non-selected power delivery switch is in the OFF state, and based at least on confirming that the non-selected power delivery switch is in the OFF state, setting the selected power delivery switch to the ON state.

In yet another example, a system comprises a power connector configured to selectively electrically connect with a power supply unit, a power delivery switch electrically intermediate the power connector and a charging circuit and configured to transition from an OFF state to an ON state, wherein the transition of the power delivery switch from the OFF state to the ON state lasts for a switching duration, and where, in the ON state, the power delivery switch allows a charging current to flow from the power supply unit through the power connector and through the power delivery switch to the charging circuit, a hardware controller configured to limit the charging current at the charging circuit to a sub-threshold current level for a current-limiting duration that is greater than the switching duration based at least on initiation of the transition of the power delivery switch from the OFF state to the ON state, wherein the charging circuit is configured to modulate the charging current to a regulated charging current after the current limiting-duration has elapsed, and deliver the regulated charging current to a system load of a computing device, and a software controller communicatively coupled with the power delivery switch and the charging circuit and configured to 1) set the charging current of the charging circuit to at or below the sub-threshold current level based at least on the power supply unit electrically connecting with the power connector, 2) based at least on confirming that the charging current of the charging circuit is at or below the sub-threshold current level, set the power delivery switch to the ON state, and 3) based at least on confirming that the power delivery switch is in the ON state, set the charging current of the charging circuit to the regulated charging current. In this example and/or other examples, the sub-threshold current level optionally may be zero.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system comprising:
a power connector configured to selectively electrically connect with a power supply unit;
a power delivery switch electrically intermediate the power connector and a charging circuit and configured to transition from an OFF state to an ON state, wherein the transition of the power delivery switch from the OFF state to the ON state lasts for a switching duration, and where, in the ON state, the power delivery switch allows charging current to flow from the power supply unit through the power connector and through the power delivery switch to the charging circuit; and
a hardware controller configured to limit the charging current at the charging circuit to a sub-threshold current level for a current-limiting duration that is greater than the switching duration based at least on initiation of the transition of the power delivery switch from the OFF state to the ON state,
wherein the charging circuit is configured to modulate the charging current to a regulated charging current after the current-limiting duration has elapsed, and deliver the regulated charging current to a system load of a computing device.

2. The system of claim 1, wherein the sub-threshold current level is zero.

3. The system of claim 1, further comprising:
a software controller communicatively coupled with the power delivery switch and the charging circuit and configured to 1) set the charging current of the charging circuit to at or below the sub-threshold current level based at least on the power supply unit electrically connecting with the power connector, 2) based at least on confirming that the charging current of the charging circuit is at or below the sub-threshold level, set the power delivery switch to the ON state, and 3) based at least on confirming that the power delivery switch is in the ON state, set the charging current of the charging circuit to the regulated charging current.

4. The system of claim 3, wherein the software controller is configured to, subsequent to setting the charging current to at or below the sub-threshold current level and based at least on confirming that the charging current is not at or below the sub-threshold current level, maintain the power delivery switch in the OFF state, where, in the OFF state, the power delivery switch prevents the charging current from flowing to the charging circuit.

5. The system of claim 3, wherein the software controller is configured to, 1) based at least on confirming that the power delivery switch is in the ON state, initiate a stabilization delay, and 2) set the charging current of the charging circuit to the regulated charging current after the stabilization delay has elapsed.

6. The system of claim 3, wherein the software controller is configured to set the charging current of the charging circuit to at or below the sub-threshold current level based at least on the power supply unit becoming electrically disconnected from the power connector.

7. The system of claim 3, wherein the power connector is a first power connector, wherein the power delivery switch is a first power delivery switch, and wherein the system further comprises:
a second power connector configured to selectively electrically connect with a second power supply unit; and
a second power delivery switch electrically intermediate the second power connector and the charging circuit and configured to transition from an OFF state to an ON state, wherein the transition of the second power delivery switch from the OFF state to the ON state takes place over a switching duration, and where, in the ON state, the second power delivery switch allows charging current to flow from the second power supply unit, through the second power connector to the charging circuit,
wherein the hardware controller is configured to limit the charging current at the charging circuit to the sub-threshold current level for a current-limiting duration that is greater than the switching duration of the second power delivery switch based at least on initiation of the transition of the second power delivery switch from the OFF state to the ON state.

8. The system of claim 7, wherein the software controller is configured to 1) set the charging current of the charging circuit to at or below the sub-threshold current level based at least on the second power supply unit electrically connecting with the second power connector, 2) based at least on confirming that the charging current of the charging circuit is at or below the sub-threshold current level, select a power delivery switch corresponding to either the first power supply unit or the second power supply unit based at least on a designated priority order, 3) set the selected power delivery switch to the ON state, and 4) based at least on confirming that the selected power delivery switch is in the ON state, set the charging current of the charging circuit to the regulated charging current.

9. The system of claim 8, wherein the software controller is configured to 1) set a non-selected power delivery switch of the first power delivery switch or the second power delivery switch to the OFF state, 2) based at least on confirming that the non-selected power delivery switch is in the OFF state, set the selected power delivery switch to the ON state.

10. The system of claim 8, wherein the first power connector and the second power connector are different types of power connectors, and wherein the priority order prioritizes selecting a first type of power connector over a second type of power connector.

11. The system of claim 8, wherein the first power supply unit and the second power supply unit have different power levels, and wherein the priority order prioritizes selecting a power supply unit having a higher power level over a power supply unit having a lower power level.

12. A method for controlling a power delivery system of a computing device, the method comprising:
  detecting that a power supply unit is electrically connected with a power connector of the power delivery system;
  setting a charging current of a charging circuit of the power delivery system to at or below a sub-threshold current level based at least on detecting that the power supply unit is electrically connected with the power connector;
  confirming that the charging current of the charging circuit is at or below the sub-threshold current level;
  based at least on confirming that the charging current of the charging circuit is at or below the sub-threshold current level, setting a power delivery switch of the power delivery system to an ON state, the power delivery switch electrically intermediate the power connector and the charging circuit, and where, in the ON state, the power delivery switch allows charging current to flow from the power supply unit through the power connector and through the power delivery switch to the charging circuit;
  confirming that the power delivery switch is in the ON state; and
  based at least on confirming that the power delivery switch is in the ON state, setting the charging current of the charging circuit to a regulated charging current, wherein the charging circuit is configured to deliver the regulated charging current to a system load of a computing device.

13. The method of claim 12, wherein the sub-threshold current level is zero.

14. The method of claim 12, further comprising:
  subsequent to setting the charging current to at or below the sub-threshold current level, confirming that the charging current is not at or below the sub-threshold current level; and
  based at least on confirming that the charging current is not at or below the sub-threshold current level, maintaining the power delivery switch in the OFF state, where, in the OFF state, the power delivery switch prevents charging current from flowing to the charging circuit.

15. The method of claim 12, further comprising:
  based at least on confirming that the power delivery switch is in the ON state, initiating a stabilization delay; and
  setting the charging current of the charging circuit to the regulated charging current after the stabilization delay has elapsed.

16. The method of claim 12, further comprising:
  detecting that the power supply unit is electrically disconnected from the power connector; and
  setting the charging current of the charging circuit to at or below the sub-threshold current level based at least on detecting that the power supply unit is electrically disconnected from the power connector.

17. The method of claim 16, further comprising:
  setting a non-selected power delivery switch of the first power delivery switch or the second power delivery switch to the OFF state;
  confirming that the non-selected power delivery switch is in the OFF state; and
  based at least on confirming that the non-selected power delivery switch is in the OFF state, setting the selected power delivery switch to the ON state.

18. The method of claim 12, wherein the power connector is a first power connector, wherein the power delivery switch is a first power delivery switch, wherein the power delivery system further comprises a second power connector configured to selectively electrically connect with a second power supply unit, wherein the power delivery system further comprises a second power delivery switch electrically intermediate the second power connector and the charging circuit and configured to transition from an OFF state to an ON state, where, in the ON state, the second power delivery switch allows a charging current to flow from the second power supply unit, through the second power connector to the charging circuit, and wherein the method further comprises:
  detecting that the second power supply unit is electrically connected to the second power connector while the first power supply unit is electrically connected to the first power connector;
  setting the charging current of the charging circuit to at or below the sub-threshold current level based at least on detecting that the second power supply unit is electrically connected with the second power connector while the first power supply unit is electrically connected to the first power connector;
  confirming that the charging current of the charging circuit is at or below the sub-threshold current level;
  based at least on confirming that the charging current of the charging circuit is at or below the sub-threshold current level, selecting a power delivery switch corresponding to either the first power supply unit or the second power supply unit based at least on a designated priority order;
  setting the selected power delivery switch to the ON state;
  confirming that the selected power delivery switch is in the ON state; and
  based at least on confirming that the selected power delivery switch is in the ON state, setting the charging current of the charging circuit to the regulated charging current.

19. A system comprising:
  a power connector configured to selectively electrically connect with a power supply unit;
  a power delivery switch electrically intermediate the power connector and a charging circuit and configured to transition from an OFF state to an ON state, wherein the transition of the power delivery switch from the OFF state to the ON state lasts for a switching duration, and where, in the ON state, the power delivery switch allows a charging current to flow from the power supply unit through the power connector and through the power delivery switch to the charging circuit;
  a hardware controller configured to limit the charging current at the charging circuit to a sub-threshold current level for a current-limiting duration that is greater than the switching duration based at least on initiation of the transition of the power delivery switch from the OFF state to the ON state, wherein the charging circuit is configured to modulate the charging current to a regulated charging current after the current limiting-duration has elapsed, and deliver the regulated charging current to a system load of a computing device; and
  a software controller communicatively coupled with the power delivery switch and the charging circuit and configured to 1) set the charging current of the charging circuit to at or below the sub-threshold current level based at least on the power supply unit electrically connecting with the power connector, 2) based at least on confirming that the charging current of the charging circuit is at or below the sub-threshold current level, set the power delivery switch to the ON state, and 3) based at least on confirming that the power delivery switch is in the ON state, set the charging current of the charging circuit to the regulated charging current.

20. The system of claim 19, wherein the sub-threshold current level is zero.

* * * * *